(12) United States Patent
Ambrus

(10) Patent No.: US 8,987,943 B2
(45) Date of Patent: Mar. 24, 2015

(54) MULTIPURPOSE AUXILIARY ENERGY TRANSMISSION DEVICE

(76) Inventor: Sándor Ambrus, Budapest (HU)

( * ) Notice: Subject to any disclaimer, the term of this patent is extended or adjusted under 35 U.S.C. 154(b) by 22 days.

(21) Appl. No.: 13/261,716

(22) PCT Filed: Feb. 21, 2012

(86) PCT No.: PCT/HU2012/000014
§ 371 (c)(1),
(2), (4) Date: Oct. 28, 2013

(87) PCT Pub. No.: WO2012/114135
PCT Pub. Date: Aug. 30, 2012

(65) Prior Publication Data
US 2014/0070615 A1    Mar. 13, 2014

(30) Foreign Application Priority Data
Feb. 21, 2011 (HU) .................... 1100049 U

(51) Int. Cl.
*H02J 1/00* (2006.01)
*H02J 7/00* (2006.01)
*H01M 2/34* (2006.01)

(52) U.S. Cl.
CPC .............. *H02J 1/00* (2013.01); *H02J 7/0042* (2013.01); *H01M 2/341* (2013.01); *H02J 7/0008* (2013.01)
USPC ....................................................... 307/104

(58) Field of Classification Search
CPC ............................................................ H02J 1/00
USPC ....................................................... 307/104
See application file for complete search history.

*Primary Examiner* — Hal Kaplan
(74) *Attorney, Agent, or Firm* — Joseph G. Seeber

(57) ABSTRACT

The subject of the invention relates to a multipurpose auxiliary energy transmission device for supplying electrical energy to portable electronic devices (1), which includes a carrier body (10) with an energy input gate (14) and an energy output gate (15) and at least two current conductor bodies (20, 30) located on the carrier body (10) which are electrically isolated from each other, where the one end (21) of the one current conductor body (20) is connected to the energy input gate (14) and its other end (22) to the energy output gate (15), while the one end (31) of the other current conductor body (30) is connected to the energy input gate (14) and its other end (32) to the energy output gate (15). The characteristic feature of the invention is that the carrier body (10) is supplemented with a reference signal forwarding gate (16) and a reference signal transmission body (40), the one end (41) of the reference signal transmission body (40) is connected to either the one current conductor body (20) or to the other current conductor body (30) and the other end (43) is connected to the reference signal forwarding gate (16) located on the edge (11) of the carrier body (10), and a voltage setting member (42) is inserted between the one end (41) and the other end (43) of the reference signal transmission body (40).

20 Claims, 1 Drawing Sheet

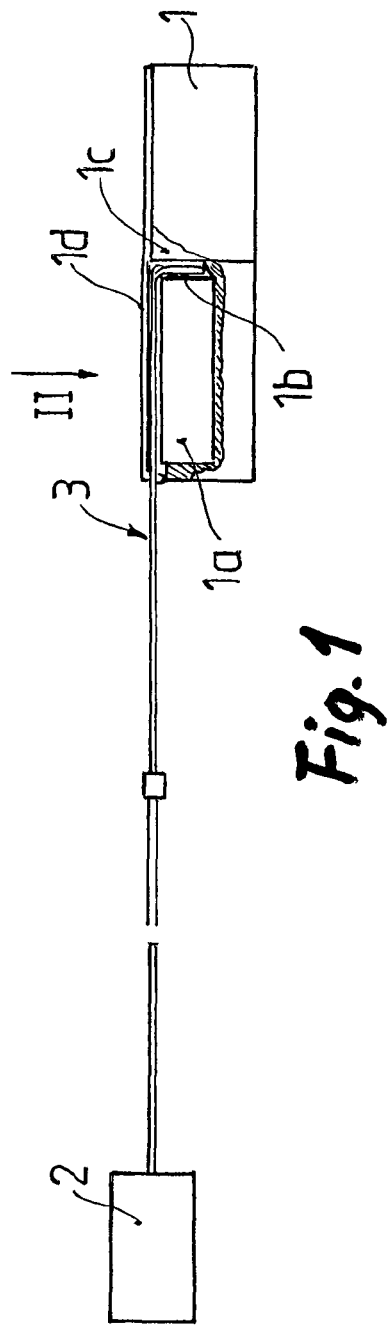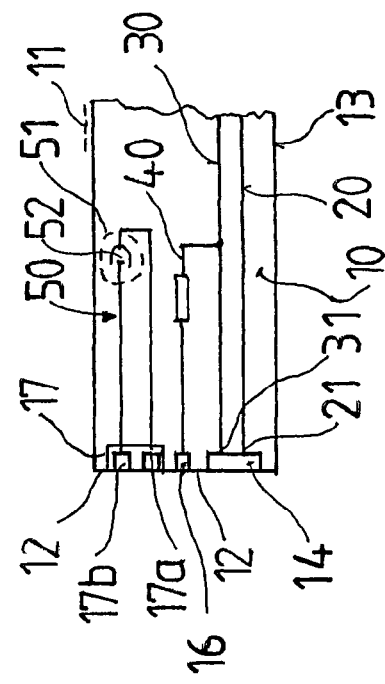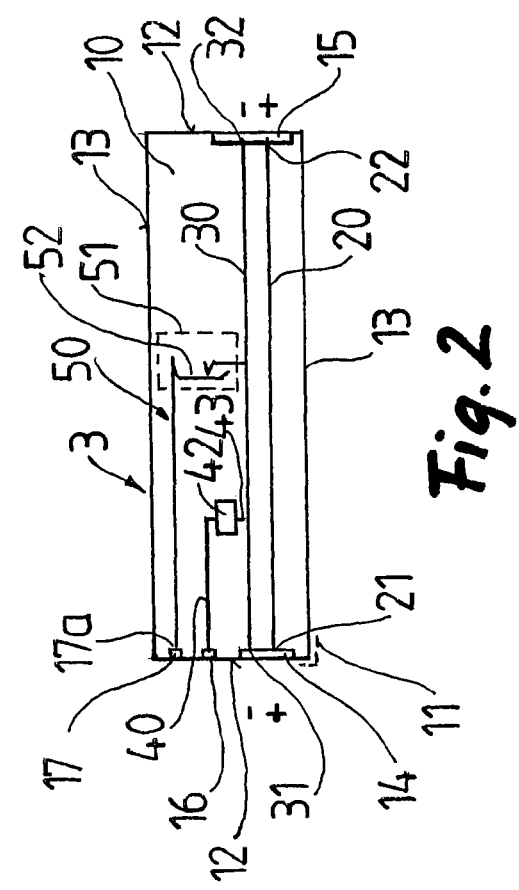
Fig. 1
Fig. 2
Fig. 3

MULTIPURPOSE AUXILIARY ENERGY TRANSMISSION DEVICE

The subject of the invention relates to a multipurpose auxiliary energy transmission device for supplying electrical energy to portable electronic devices, which includes a carrier body with an energy input gate and an energy output gate and at least two current conductor bodies located on the carrier body which are electrically isolated from each other, where the one end of the one current conductor body is connected to the energy input gate and its other end to the energy output gate, while the one end of the other current conductor body is connected to the energy input gate and its other end to the energy output gate.

As a result of the development of the industry dealing with the development and production of semiconductors and as a result of the development of the information technology sector, portable electronic devices are being produced that are capable of increasingly greater performance and that provide an increasingly wider range of services. However, the energy demand of the new devices is growing, as a consequence of which the batteries of portable electronic devices, especially video cameras and premium category digital cameras require charging at shorter intervals.

In the interest of selling such devices it has been made possible to try out these devices whilst in operation at the points of sale. In the interest of the continuous operability of the exhibited products their batteries must be kept charged. In general the charging may be solved with the battery charger device belonging to the given device. Such a battery charging device is presented in patent application publication number WO 2010/098577.

However, the disadvantage of the battery charging solutions normally used is that trying out the product presents difficulty due to their being connected to the given device.

A further disadvantage is that besides the antitheft protection of the device, the battery charging device must also be protected, which makes the installation of further sensors and signal transmission cables necessary. This circumstance does not only further increase the difficulty of trying out the devices, it also increases the installation and operation costs of the goods protection equipment.

Yet another feature that must be viewed as a disadvantage is that in connection with the further development of the products offered for sale and the appearance of devices that offer new services, the size and format of the connector on the house of the device—that also serves for charging the battery—change, therefore, the charger cable and its connector must also be frequently replaced, which involves extra costs and demands extra work.

Our objective with the auxiliary device according to the invention was to overcome the deficiencies of the known battery charging solutions serving the showroom operation of portable electronic devices and to create a version that can be connected to the given portable electronic device in such a way so that it does not use the usual connection fitting for charging the battery located in it, and makes it easier to try out the device and, furthermore, also ensures protection against theft of the battery.

The basis of the solution according to the invention was formed by the recognition that during the assembly of portable electronic devices thin, empty gaps are formed between the device housing and the battery cover, as a result of the production technology of the components, through which gaps it is possible to insert a plate-like element from the external environment into the internal space of the house.

As a consequence of this the recognition that led to the creation of the auxiliary energy transmission device according to the invention was that if in an unusual way we take the electric energy serving to charge the battery inside the device via current conductors arranged on a thin flexible carrier body and on this carrier body we place unique electronic elements that are capable of setting the parameters of the incoming electric current to the level appropriate for the battery operating the given portable electronic device, then the electric energy regulated in this way is capable of charging the given battery in such a way that it can continuously supply the device even in the case of greater, impulse energy demands, e.g. when the flash of a camera is used, while the carrier body does not prevent the simple handling of the device, and does not damage the aesthetic appearance of the device, and so the task may be solved.

In accordance with the set objective the multipurpose auxiliary energy transmission device according to the invention for supplying electrical energy to portable electronic devices,—which includes a carrier body with an energy input gate and an energy output gate and at least two current conductor bodies located on the carrier body which are electrically isolated from each other, where the one end of the one current conductor body is connected to the energy input gate and its other end to the energy output gate, while the one end of the other current conductor body is connected to the energy input gate and its other end to the energy output gate,—is set up in such a way that the carrier body is supplemented with a reference signal forwarding gate and a reference signal transmission body, the one end of the reference signal transmission body is connected to either the one current conductor body or to the other current conductor body and the other end is connected to the reference signal forwarding gate located on the edge of the carrier body, and a voltage setting member is inserted between the one end and the other end of the reference signal transmission body.

A further feature of the energy transmission device according to the invention is that the carrier body is a flexible film.

In the case of another version of the invention the reference signal forwarding gate is located at the edge of the carrier body in the vicinity of the energy input gate.

From the point of view of the auxiliary energy transmission device it may be favourable if the carrier body is supplemented with a sabotage signalling gate and status sensing body, and if the status sensing body is connected to the sabotage signalling gate. In a given case the status sensing body is supplied with a switching element containing a pressure contact.

In the case of a still different embodiment of the invention the sabotage signalling gate has a contact piece, and the status sensing body is in an electric conducting connection with the contact piece and with either the one current conductor body or with the other current conductor body.

In the case of another embodiment of the auxiliary energy transmission device the sabotage signalling gate has at least two contact pieces, and the status sensing body is inserted between the one contact piece and the other contact piece.

The most important advantage of the auxiliary energy transmission device according to the invention is that as a consequence of the new formation of the carrier body the charging of the battery can be realised directly at the terminals of the battery without the use of the original connector located on the portable electronic device when manufactured.

A further advantage deriving from this is that there is no need to continuously replace the showroom auxiliary energy transmission devices due to the changing of the connectors on the portable electronic devices. An advantage also due to this is that due to the voltage setting member located on the carrier body in a unique way it also becomes possible to charge devices with a higher performance demand in a reliable and simple way. Even the charging parameters may be set with the help of the voltage setting member, so a product-specific auxiliary energy transmission device can be set up, which feature also excludes the possibility of the portable electronic device being connection to the wrong charger, which could cause the device or the battery to be damaged or ruined.

It is also a favourable feature that the auxiliary energy transmission device according to the invention may be manufactured simply, with known procedures and with favourable costs. Its installation or even replacement does not demand a great deal of specialist knowledge. Due to its set-up, its application does not make difficult or prevent the trying out of the given portable electronic device.

Another feature that may be listed among the advantages is that due to the status sensing body installed on the carrier body in a unique way—if necessary—the protection of the battery of the given portable electronic device may be solved at the same time it is being charged, and the unauthorised removal and theft of the battery, made accessible by the removal of the battery cover, from the portable electronic device can be excluded. To date this problem could be solved using the known goods protection devices in a much more complex way.

In the following we present the auxiliary energy transmission device according to the invention in more detail, in connection with construction examples, on the basis of a drawing. On the drawing FIG. 1 shows an outline picture of a version of the auxiliary energy transmission device according to the invention with the auxiliary energy transmission device in its position of use FIG. 2 shows a view of FIG. 1 from the direction II FIG. 3 displays a detail of a different embodiment of the auxiliary energy transmission device.

An auxiliary energy transmission device 3 can be seen in FIG. 1 and FIG. 2 the carrier body 10 of which is made from a thin, flexible plastic sheet. The edge 11 of the carrier body 10 is formed by two shorter sides 12 and two longer sides 13, in such a way that here the carrier body 10 forms a regular rectangle. The energy input gate 14 is located on one of the shorter sides 12 of the carrier body 10, while the other shorter side 12 contains the energy output gate 15. The one current conductor body 20 and the other current conductor body 30 stretch between the energy input gate 14 and the energy output gate 15 in such a way that the one end 21 of the one current conductor body 20 is connected to the energy input gate 14 and its other end 22 is connected to the energy output gate 15, while the one end 31 of the other current conductor body 30 is connected to the energy input gate 14 and its other end 32 is connected to the energy output gate 15. Naturally, the one current conductor body 20 and the other current conductor body 30 are isolated from each other.

As FIG. 1 shows the one current conductor body 20 is in connection with the basic energy source 2, while the energy output gate 15 is connected to the energy receipt input 1b of the battery 1a placed in the internal space 1c of the portable electronic device 1, and in this way the auxiliary energy transmission device 3 forwards the electric energy from the basic energy source 2 to the battery 1a of the portable electronic device 1.

FIG. 2 also illustrates that the reference signal forwarding gate 16 is located on the one shorter side 12 of the carrier body 10, which also carries the energy input gate 14, to which the one end 41 of the reference signal transmission body 40 is connected. In this embodiment, the other end 43 of the reference signal transmission body 40 is connected to the other current conductor body 30. The voltage setting member 42 may be found between the one end 41 and the other end 43 of the reference signal transmission body 40, which, in this case, contains an electric resistor. The resistance value of this voltage setting member 42 provides the voltage value for the basic energy source 2 on the basis of which the basic energy source 2 sends electric current with the appropriate parameters through the set of the one current transmission body 20 and the other current transmission body 30 between the energy input gate 14 and the energy output gate 15 of the carrier body 10. Here we must note that the voltage setting member 42 of the reference signal transmission body 40 operates in unison with further electro-technology elements—not indicated here—belonging to the basic energy source 2, and the interaction of these makes it possible for the voltage setting member 42 located on a given auxiliary energy transmission device 3 to transmit electric energy with specific parameters between the energy input gate 14 and the energy output gate 15.

On FIG. 2 it can also be seen that in this version of the auxiliary energy transmission device 3 a status sensing body 50 and sabotage signalling gate 17 are located on the carrier body 10. The sabotage signalling gate 17 is also to be found on the one shorter side 12 of the carrier body 10 on which the energy input gate 14 and the reference signal forwarding gate 16 is located. The status sensing body 50 is connected between the contact piece 17a of the sabotage signalling gate 17 and the other current conductor body 30. Also, the status sensing body 50 has a switching element 51 containing a pressure contact 52. The task of the status sensing body 50 is—after the auxiliary energy transmission device 3 has been put into operation—is to send an alarm signal to the monitoring centre if the portable electronic device 1 is affected by any sort of sabotage.

Here it must be noted that in the case of a given embodiment of the auxiliary energy transmission device 3 the one current conductor body 20, the other current conductor body 30, the reference signal transmission body 40, the voltage setting member 42 and the status sensing body 50 are formed by a pattern of an electrically conducting material, e.g. metal, vapour-deposited onto the insulating plastic surface of the carrier body 10—using a technology known in itself. Another protective layer, also of an insulating material, is placed over the pattern.

For the operation of the auxiliary energy transmission device 3 according to FIGS. 1 and 2 first the carrier body 10 must be positioned into the internal space 1c of the portable electronic device 1 so that the energy output gate 15 is connected to the energy receipt input 1b of the battery 1a of the portable electronic device 1. Following this the opening serving to accommodate the battery 1a must be closed with the cover 1d so that the cover 1d forces the pressure contact 52 of the status sensing body 50 to the battery 1a, while the carrier body 10 of the auxiliary energy transmission device 3 protrudes out of the gap between the portable electronic device 1 and the cover 1d from the internal space 1c of the portable electronic device 1. Finally the energy input gate 4 of the carrier body 10 of the auxiliary energy transmission device 3 may be connected to the basic energy source 2.

After the auxiliary energy transmission device 3 has been inserted the electric energy arrives from the basic energy source 2 to the energy input gate 14 of the auxiliary energy transmission device 3 and charges the battery 1a of the portable electronic device 1a through the one current conductor body 20 and the other current conductor body 30 via the energy output gate 15 connected to the energy receipt input 1b. When the electric current progresses along the pathway: one end 31—other current conductor body 30—other end 43 of the reference signal transmission body 40—voltage setting member 42—one end 41 of the reference signal transmission body 40—reference signal forwarding gate 16, then as a consequence of the voltage setting member 42 the reference signal forwarding gate 16 signals back to the basic energy source 2 what parameters are required in order to appropriately charge the battery 1a of the portable electronic device 1, and as a consequence of the voltage setting member 42 the basic energy source 2 supplies electric energy with these characteristics for the charging of the battery 1a.

Naturally, after the electric current has started to flow in the one current conductor body 20 and in the other current conductor body 30, then the one end 31—the other current conductor body 30—the switching element 51—status sensing body 50—sabotage signalling gate 17 are under voltage and so a signal is sent through the sabotage signalling gate 17 to the monitoring centre that the pressure contact 52 of the switching element 51 of the status sensing body 50 is closed, i.e. the portable electronic devices has not been subjected to an undesired external effect. If the cover 1d of the portable electronic device 1 is removed for the purpose of removing the battery 1a then the pressure contact 52 becomes open and a signal is then sent to the monitoring centre from the sabotage signalling gate 17 that the cover 1d is open. In this way the fact of sabotage becomes immediately apparent and the necessary measures may be taken.

FIG. 3 shows the part of another version of the auxiliary energy transmission device 3 in the vicinity of the energy input gate 14. Here too the energy input gate 14 is located on one of the shorter sides 12 of the edge 11 of the carrier body 10. Here also the carrier body 10 contains the one current conductor body 20 and the other current conductor body 30, the one end 21 and the one end 31 of which here also are connected to the energy input gate 14. The reference signal transmission body 40 may also be found, which is inserted between the other current conductor body 30 and the reference signal forwarding gate 16, and the status sensing body 50 with the switching element 51 providing the pressure contact 52 is also present. The difference is that in this embodiment the sabotage signalling gate 17 has a one contact piece 17a and another contact piece 17b. The status signalling body 50 is inserted between the one contact piece 17a and the other contact piece 17b. In this version the operation of the status sensing body 50 may be independent from the basic energy source 2 charging the battery 1a of the portable electronic device 1. Naturally, in this case the sabotage signalling gate 17 must be connected to another source of energy, not indicated on the figure, so if the basic energy source 2 is switched off the power supply to the status sensing body 50 is not terminated and if the cover 1d of the portable electronic device 1 is removed, the alarm is set off even if the battery is not being charged.

It is obvious that the edge 11 of the carrier body 10 may have any shape, and its shape, as well as the number, length or even curvature of the shorter sides 12 and the longer sides 13 are only determined by practicality, so that the carrier body 10 of the auxiliary energy transmission device 3 may be inserted into the internal space 1c of the portable electronic device 1 through the cover 1d as simply as possible.

The auxiliary energy transmission device according to the invention may be applied to good effect in all cases when the simple, secure and aesthetic charging of the batteries of portable electronic devices when being presented in the showroom must be carried out so that in a given case the protection against the theft of the battery must also be solved.

LIST OF REFERENCES

| 1 portable electronic device | 1a battery |
| | 1b energy receipt input |
| | 1c internal space |
| | 1d cover |
| 2 basic energy source | |
| 3 auxiliary energy transmission device | |
| 10 carrier body | 11 edge |
| | 12 shorter side |
| | 13 longer side |
| | 14 energy input gate |
| | 15 energy output gate |
| | 16 reference signal forwarding gate |
| | 17 sabotage signalling gate |
| | 17a contact piece |
| | 17b another contact piece |
| 20 one current conductor body | 21 one end |
| | 22 other end |
| 30 other current conductor body | 31 one end |
| | 32 other end |
| 40 reference signal transmission body | 41 one end |
| | 42 voltage setting member |
| | 43 other end |
| 50 status sensing body | 51 switching element |
| | 52 pressure contact |

The invention claimed is:

1. A multipurpose auxiliary energy transmission device for supplying electrical energy to portable electronic devices, said multipurpose auxiliary energy transmission device comprising:
    a carrier body including an energy input gate and an energy output gate; and
    at least two current conductor bodies which are located on the carrier body and which are electrically isolated from each other, wherein said at least two current conductor bodies include a first current conductor body and a second conductor body;
    wherein said first current conductor body has one end connected to the energy input gate and another end connected to the energy output gate, and said second current conductor body has one end connected to the energy input gate and another end to the energy output gate;
    wherein the carrier body includes a reference signal forwarding gate and a reference signal transmission body, one end of the reference signal transmission body being connected to one of the first current conductor body and the second current conductor body, and another end of the reference signal transmission body being connected to the reference signal forwarding gate which is located on an edge of the carrier body;
    wherein the carrier body includes a voltage setting member inserted between said one end of the reference signal transmission body and said another end of the reference signal transmission body; and
    wherein the carrier body includes a status sensing body and a contact piece, the status sensing body including a switching element containing a pressure contact, the switching element being an electric conducting connection with the contact piece of the carrier body.

2. The multipurpose auxiliary energy transmission device according to claim 1, wherein the status sensing body is electrically connected to one of the first current conductor body and the second current conductor body.

3. The multipurpose auxiliary energy transmission device according to claim 2, wherein the reference signal forwarding gate is located at the edge of the carrier body in a vicinity of the energy input gate.

4. The multipurpose auxiliary energy transmission device according to claim 3, wherein the carrier body includes a sabotage signaling gate, and the sabotage signaling gate is connected to the contact piece of the carrier body.

5. The multipurpose auxiliary energy transmission device according to claim 4, wherein the sabotage signaling gate includes at least two contact pieces, and the status sensing body is inserted between one of the contact pieces and another of the contact pieces.

6. The multipurpose auxiliary energy transmission device according to claim 5, wherein the carrier body comprises a flexible film.

7. The multipurpose auxiliary energy transmission device according to claim 4, wherein the carrier body comprises a flexible film.

8. The multipurpose auxiliary energy transmission device according to claim 3, wherein the carrier body comprises a flexible film.

9. The multipurpose auxiliary energy transmission device according to claim 2, wherein the carrier body comprises a flexible film.

10. The multipurpose auxiliary energy transmission device according to claim 2, wherein the carrier body includes a sabotage signaling gate, and the sabotage signaling gate is connected to the contact piece of the carrier body.

11. The multipurpose auxiliary energy transmission device according to claim 10, wherein the sabotage signaling gate includes at least two contact pieces, and the status sensing body is inserted between one of the contact pieces and another of the contact pieces.

12. The multipurpose auxiliary energy transmission device according to claim 11, wherein the carrier body comprises a flexible film.

13. The multipurpose auxiliary energy transmission device according to claim 10, wherein the carrier body comprises a flexible film.

14. The multipurpose auxiliary energy transmission device according to claim 1, wherein the carrier body includes a sabotage signaling gate, and the sabotage signaling gate is connected to the contact piece of the carrier body.

15. The multipurpose auxiliary energy transmission device according to claim 14, wherein the sabotage signaling gate includes at least two contact pieces, and the status sensing body is inserted between one of the contact pieces and another of the contact pieces.

16. The multipurpose auxiliary energy transmission device according to claim 15, wherein the carrier body comprises a flexible film.

17. The multipurpose auxiliary energy transmission device according to claim 14, wherein the carrier body comprises a flexible film.

18. The multipurpose auxiliary energy transmission device according to claim 1, wherein the reference signal forwarding gate is located at the edge of the carrier body in a vicinity of the energy input gate.

19. The multipurpose auxiliary energy transmission device according to claim 18, wherein the carrier body includes a sabotage signaling gate, and the sabotage signaling gate is connected to the contact piece of the carrier body.

20. The multipurpose auxiliary energy transmission device according to claim 19, wherein the sabotage signaling gate includes at least two contact pieces, and the status sensing body is inserted between one of the contact pieces and another of the contact pieces.

\* \* \* \* \*